United States Patent [19]
Huang

[11] Patent Number: 5,179,856
[45] Date of Patent: Jan. 19, 1993

[54] PRESSURE GAUGE
[75] Inventor: Roger M. C. Huang, Taipei, Taiwan
[73] Assignee: Bestek Electronics Corp., Taipei, Taiwan
[21] Appl. No.: 686,988
[22] Filed: Apr. 18, 1991
[51] Int. Cl.⁵ .......................... G01L 9/02; G01L 27/00
[52] U.S. Cl. .................................. 73/4 R; 73/146.8; 73/725; 338/42
[58] Field of Search ................ 73/146.8, 146.5, 725, 73/726, 4 R, 727; 338/42

[56] References Cited
U.S. PATENT DOCUMENTS 4,718,278  1/1988  Bergsma ............................. 73/4 R
4,967,047  10/1990  Betterton et al. .................. 73/725

Primary Examiner—Donald O. Woodiel
Attorney, Agent, or Firm—Marks & Murase

[57] ABSTRACT

Disclosed is a pressure gauge which is mainly composed of two parts, a pressure sensing element and an electronic processing and displaying unit. The pressure sensing element includes an elastic member and a variable resistor whose resistance value can be varied by the force of the pressure. An output electrical signal is occasioned by the electronic circuit, which is in proportions corresponding to the resistance value of the variable resistor. The electronic processing and displaying unit will further process the output electrical signal and display the value of the pressure in an indicator, preferably a liquid crystal display (LCD). The pressure goes through a calibration process every time when the power is just turned on to calibrate an initial output electrical signal occasioned by the variable resistor. The electronic processing and displaying unit also includes switches which are selected during the manufacturing process in accordance with the manufacturing error of the elastic constant of the elastic member incorporated in the pressure gauge. The pressure gauge further includes means for displaying the pressure in different unit.

11 Claims, 5 Drawing Sheets

5,179,856

PRESSURE GAUGE

BACKGROUND OF THE INVENTION

The present invention relates generally to a pressure gauge, and more particularly, to a pressure gauge which is more accurate and easy to assemble and operate.

A pressure gauge is an instrument designed to indicate the pressure state of a fluid, either a gas or a liquid, or a pressing force such as weight. Conventionally, a pressure gauge is constructed by utilizing a mechanical transducer having a pressure sensing element which is mechanically coupled to an indicating pointer. The pressure sensing element produces a displacement when a stress of pressure is exerted thereupon, whereby the pointer is caused to rotate around a center pivot and thus indicate the pressure value against a calibrated dial. One other type of pressure gauge is a fountainpen-like gas pressure gauge, in which the pressure sensing element is a calibrated rule. The gas pressure causes a displacement of the rule, and the pressure value can thus be read by a mark indicating the pressure value against the scales on the rule.

These above mentioned pressure gauges are all mechanical type. Mechanical type pressure gauges generally require more elaborated and precise elements such as gears, springs, couplings, indicating pointers ... etc. for the construction. Thus, precision engineering works are often needed in the manufacturing process. Moreover, due to the nature of these mechanical elements, the ability to enhance the accuracy of the measured pressure in a mechanical type pressure gauge is often limited.

SUMMARY OF THE INVENTION

It is a primary object of the present invention to provide a pressure gauge which requires less mechanical elements and is easier to assemble.

It is another object of the present invention to provide a pressure gauge which offers a more accurate pressure measurement than the mechanical type pressure gauges.

It is still another object of the present invention to provide a pressure gauge which is compact, handy and easy-to-operate.

The foregoing and other objects are achieved in accordance with the present invention by providing a pressure gauge, which comprises mainly a pressure sensing element and an electronic processing & displaying unit. The pressure sensing element includes an elastic member and a variable resistor whose resistance value can be varied by a pressing force exerted on the pressure sensing element. An output electrical signal is occasioned by the electronic circuit, which is in proportions corresponding to the resistance value of the variable resistor. The electronic processing and displaying unit processes the output electrical signal and displays the value of the pressure in an indicator, preferably a liquid crystal display (LCD). The pressure gauge goes through a calibration process every time when the power is just turned on to calibrate the initial output electrical signal occasioned by the variable resistor. The electronic processing and displaying unit also includes a plurality of switches which are preselected during the manufacturing process in accordance with the manufacturing error of the elastic constant of the elastic member incorporated in the pressure gauge. The pressure gauge further includes means for displaying the pressure in different unit.

A more detailed understanding of the pressure gauge according to the present invention can be achieved by a reading of the following detailed description in conjunction with the accompanying drawings.

DETAILED DESCRIPTION OF THE PREFERRED EMBODIMENTS

Figure 1:
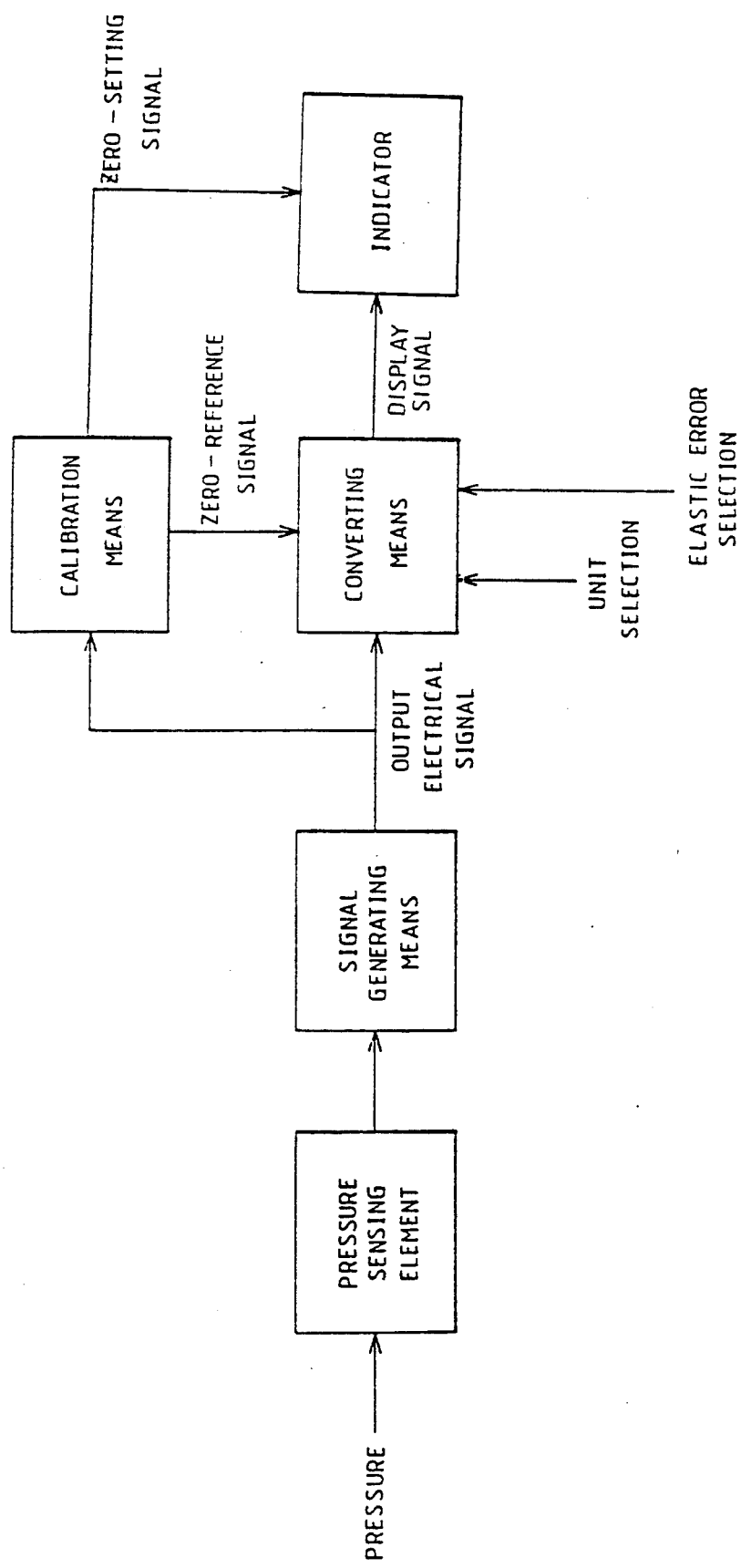
FIG. 1 is a schematic block diagram which represents the fundamental concept of a pressure gauge according to the present invention.
Figure 2:
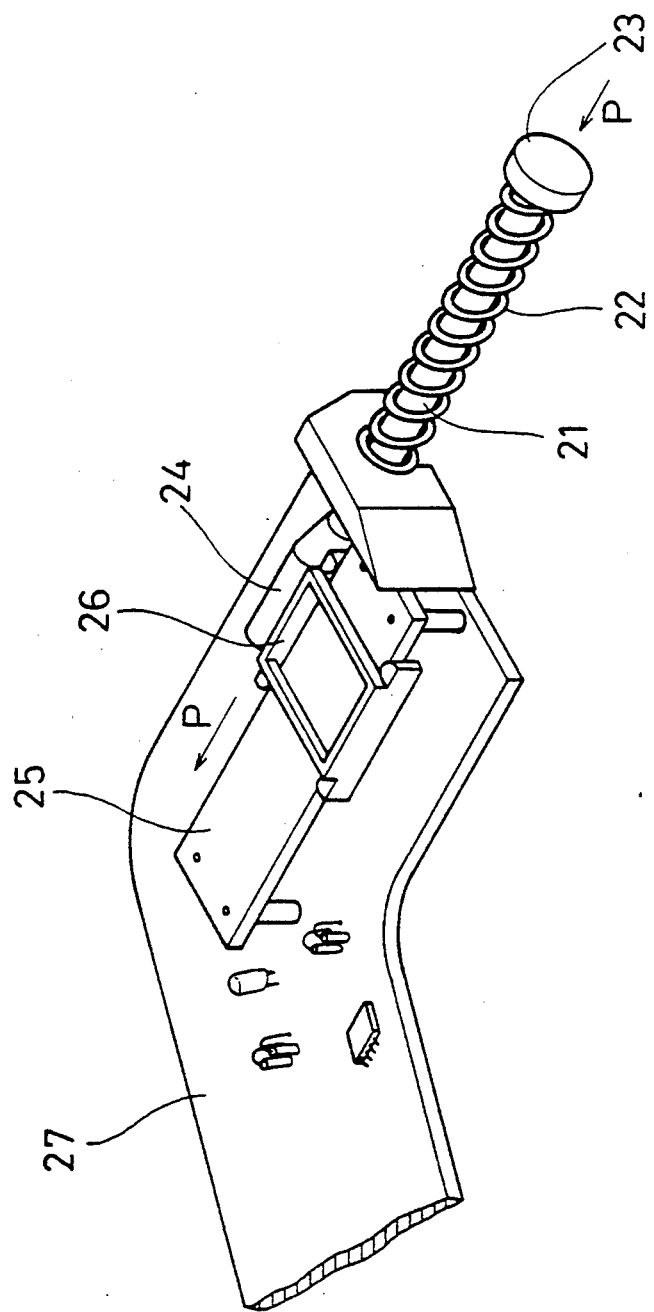
FIG. 2 is a perspective view of a preferred embodiment of a tire pressure gauge with parts broken away to show a pressure sensing element and a slide variable resistor.

Referring to FIG. 1, there is shown a schematic block diagram which represents the fundamental concept of a pressure gauge according to the present invention. As shown, a numeral 10 designates a block which represents a pressure sensing element. Referring now to FIG. 2 for a more detailed description of the pressure sensing element 10, the pressure sensing element 10 includes a sliding member 21, a spring 22, a pressure receiving disk 23, a slide variable resistor 25 having a moving portion 26, and a coupling 24. The moving portion 26 of the variable resistor 25 is coupled to one end of the sliding member 21 via the coupling 24 so that when the force of a pressure is exerted upon the free end (the disk 23) of the sliding member 21, the movement of the sliding member 21 will cause a displacement of the moving portion 26 of the variable resistor 25 and thus change the resistance value of the variable resistor 25. After the completion of each measurement, the spring 22 will bring the moving portion 26 of the variable resistor 25 to return to its initial position.

Referring now back to FIG. 1, a numeral 20 designates a block which represents means for generating an output electrical signal. An output electrical signal, such as a current or a voltage, will be produced by the signal generating means 20 in proportions corresponding to the resistance value of the variable resistor 25. A numeral 30 designates a block which represents means for converting the output electrical signal from signal generating means 20 into a corresponding display signal. A numeral 40 designates a block which represents an indicator for displaying the value of the pressure. The indicator 40 can be made either a coiled pointer or a digital display such as LCD (liquid crystal display). But the LCD is much more preferred to be employed in the embodiment since it is an object of the present invention to minimize the use of mechanical elements in the pressure gauge. The display signal from converting means 30 is transferred to the indicator 40 for controlling the displayed value thereof.

In addition to the blocks described above, the block diagram in FIG. 1 further comprises calibrating means 50. Due to a fact that the moving portion 26 of the variable resistor 25 may not always return to and stay at the same initial position after it has undergone an elastic movement, the subsequent pressure measurement may be inaccurate. Thus, the calibrating means is employed for calibrating an initial output electrical signal occasioned by the initial displacement of the moving portion 26 of the variable resistor 25. The calibrating means 50 first detects the initial output electrical signal occasioned by the initial displacement of the moving portion 25 of the variable resistor 26, and stores this signal as a zero-reference signal. Then, when the pressure gauge is measuring the pressure, the converting means 30 will compare the output electrical signal occasioned by the pressured displacement of the sliding member 21, with the zero-reference signal and produce a corresponding display signal.

Figure 3:
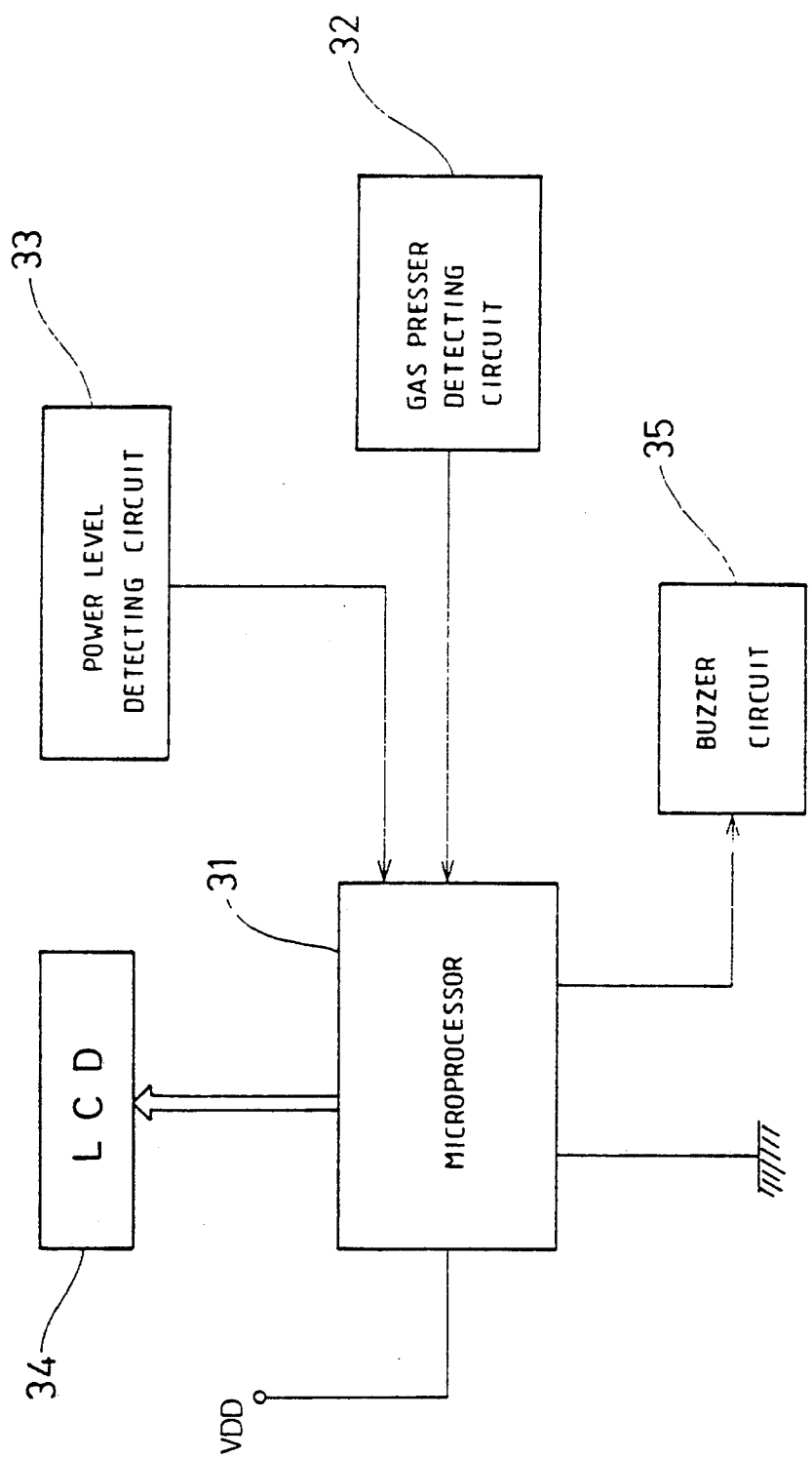
FIG. 3 is a circuit block diagram of the tire pressure gauge according to the schematic block diagram in FIG. 1.
Figure 4:
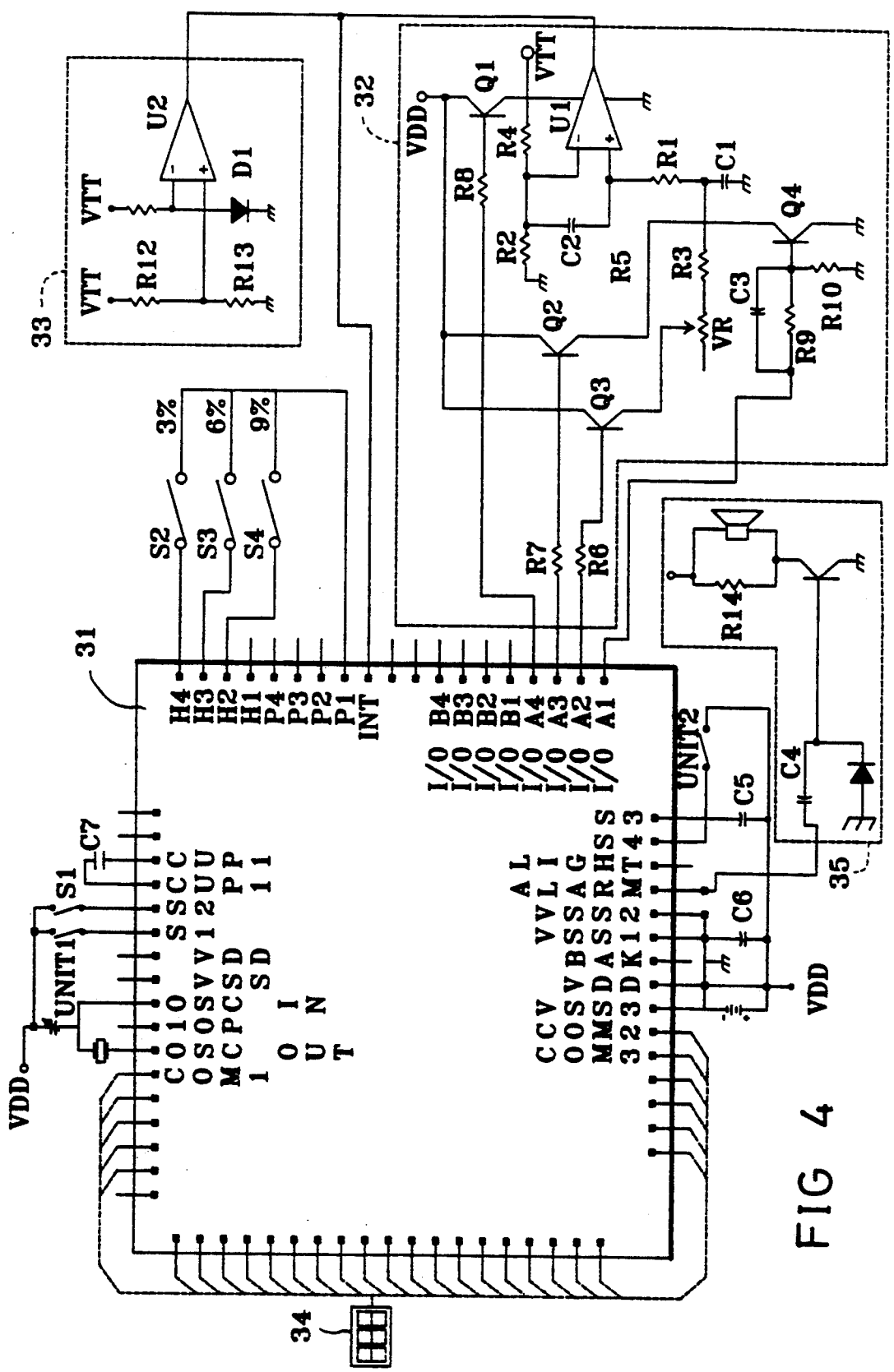
FIG. 4 is a detailed circuit diagram used in the tire pressure gauge according to the circuit block diagram in FIG. 3.

Referring now to FIGS. 3 and 4, there are respectively shown a schematic circuit block diagram and its detailed circuit diagram. The circuit is designed to implement the functional block diagram shown in FIG. 1, and is incorporated in a tire pressure gauge which is a first preferred embodiment of the present invention. The circuit employed a microprocessor unit 31 as the converting means 30 and the calibrating means 50, and for controlling the display of the indicator 40. As shown in FIG. 3, the circuit includes pressure detecting circuit 32, power detection circuit 33, display unit 34, and a buzzer circuit 35. As shown in more detail in FIG. 4, the pressure detecting circuit 32 includes a variable resistor VR, capacitor C1, transistors Q1, Q2, Q3, Q4 and comparator U1. When the circuit is initially turned on, a current will flow through the variable resistor VR and charge the capacitor C1. When the capacitor C1 is fully charged, the voltage across the capacitor C1 is taken as the zero-reference signal. When the resistance value of the variable resistor VR is changed by a pressing force, the voltage drop change across the capacitor C1 is detected by the comparator U1. The output of the comparator U1 is transferred into the microprocessor unit 31 which processes the signal, calculates the pressure value corresponding to the voltage drop change in a predetermined manner, and produces the corresponding display signal. The display unit 34 then receives the display signal and displays the value of the pressure.

The power level detecting circuit 33 is used to detect the level of the power supply. When the power level is too low, a comparator U2 in the circuit will send a signal to the microprocessor unit 31 and a message "LOW" will be shown on the display unit 34 to inform the user to replace a new set of batteries.

The display unit 34 coupled to the microprocessor unit 31 is used for displaying the value of the measured pressure as well as messages such as "LOW" indicating low power level.

The buzzer circuit 35, also coupled to the microprocessor unit 31, is used for making sound signals to notify the user of certain states of the pressure gauge. For example, in the embodiment of the tire pressure gauge, the buzzer will generate two sounds "Bi Bi" when the calibration process is done and the gauge is ready for measuring tire pressure, or four sounds "Bi Bi Bi Bi" when the value of the tire pressure has been displayed on the LCD.

Referring to FIG. 4, two switches UNIT1 and UNIT2 are provided for selecting a proper unit for the displayed numerical value of the gas pressure. For example, when UNIT1 and UNIT2 are all in OFF state, the pressure gauge will show the gas pressure in PSI (Pound/in$^2$); when UNIT1 is OFF and UNIT2 is ON, the pressure gauge will show the gas pressure in Kg/cm$^2$; and when UNIT1 is ON and UNIT2 is OFF, the pressure gauge will show the gas pressure in BAR, as shown in the following table:

|  | PSI | Kg/cm$^2$ | BAR |
| --- | --- | --- | --- |
| UNIT1 | OFF | OFF | ON |
| UNIT2 | OFF | ON | OFF |

In a second preferred embodiment of the present invention as a weighing machine, these switches can be designed for selecting the unit either in Kg or in POUND.

Moreover, the circuit shown in FIG. 4 also includes switches S1, S2, S3, S4. These switches are selected in the manufacturing process in accordance with the manufacturing error of the elastic constant of the spring 22 incorporated in the tire pressure gauge. For example, S2 is selected if the error is within 3%; S3 is selected if the error is within 6%; and S4 is selected if the error is within 9%. The microprocessor unit 31 will process the output electrical signal in accordance with the error range selected. Since the manufacturing error of the elastic constant of the spring 22 incorporated in the tire pressure gauge has been taken into account, the pressure measurement is much more precise than the mechanical type pressure gauge.

Figure 5:
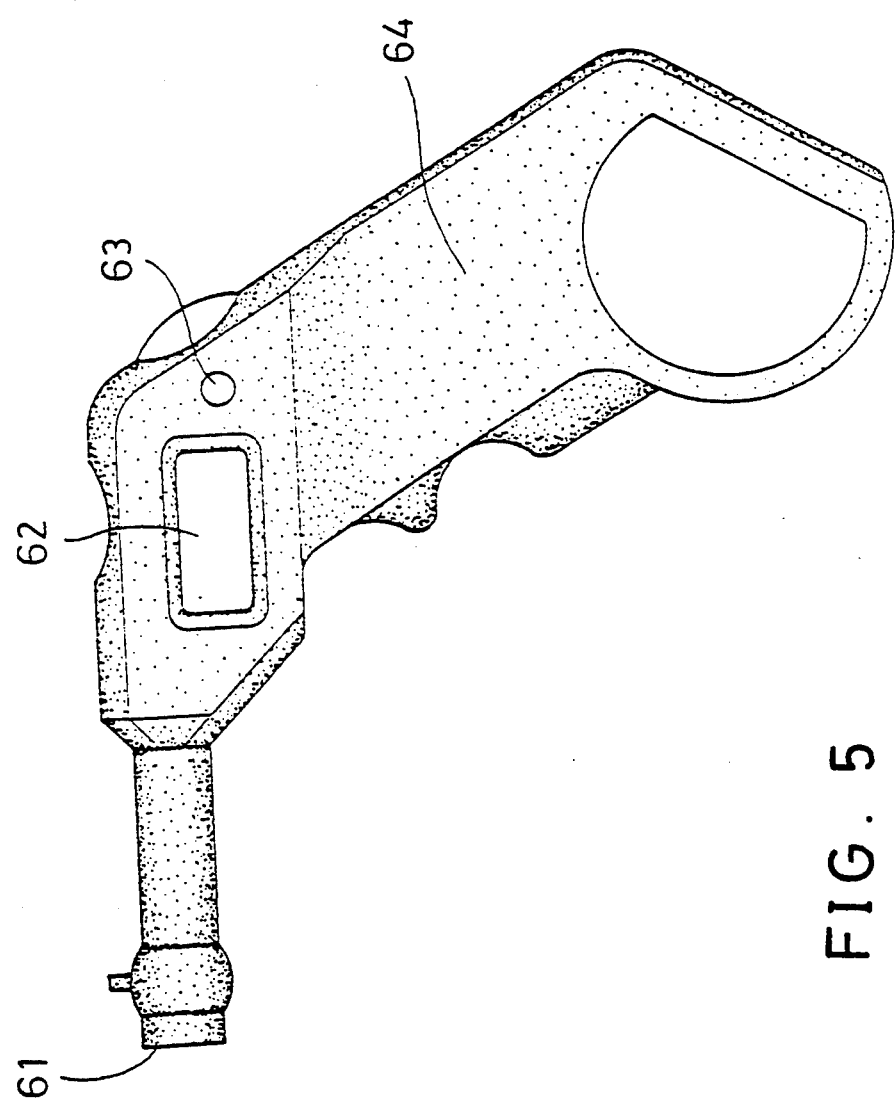
FIG. 5 is an elevational side view of a preferred embodiment of the tire pressure gauge according to the present invention.

Referring to FIG. 5, there is shown an elevational side view of a housing design of the tire pressure gauge according to the present invention. As shown in the figure, an LCD 62 is employed as the indicator 40. A numeral 61 indicates the pressure receiving head, a numeral 63 indicates a power switch, and a numeral 64 indicates the handle. The compact, smooth and easy-to-handle design of this tire pressure gauge is also a result of the non-4echanical construction inside the housing according to the present invention.

The operation of the tire pressure gauge is first to press the power switch 63. A "000" will then be displayed on the LCD 62. When the calibration process is done, the buzzer (not shown) inside the gauge will sound "Bi Bi" indicating the tire pressure gauge is ready for measuring a tire pressure. When the gas pressure receiving head 61 is positioned against a gas outlet of a tire, the LCD 62 will instantly display the value of the tire pressure thereof, and the buzzer will sound "Bi Bi Bi Bi" indicating that the pressure is being displayed on the LCD. After a few second, the power will be shut down automatically for saving battery energy. If another measurement is needed, the power switch 63 can be pressed again and the pressure gauge will be reset and ready for another measurement.

The advantages of the present invention is clearly shown that a more convenient pressure gauge has been provided. In addition, the pressure is also more accurate than the mechanical type pressure gauge.

While the present invention has been described by way of example and in terms of a preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A pressure gauge comprising:
a pressure sensing member for sensing the gas pressure, said pressure sensing member including an elastic member having an elastic tolerance and a variable resistor, said variable resistor having a moving contact coupled to said elastic member such that the movement of said elastic member causes a displacement of said moving contact and whereby the resistance value of said variable resistor is adjusted;
means for generating a first signal, the first signal being indicative of the resistance value of said variable resistor;
calibrating means for presetting an initial output first signal generated by initial displacement of said moving contact of said variable resistor as a zero-reference signal before the gauged gas pressure is actually exerted to said pressure sensing member;
means for preselecting the value of the elastic tolerance of said elastic member;
means for generating a display control signal in accordance with the comparison of the first signal generated by the gauged gas pressure against the zero-reference signal and the value of the elastic tolerance of said elastic member; and
an indicator, responsive to the display control signal, for displaying the value of the gas pressure sensed by said pressure sensing member.

2. An apparatus according to claim 1, wherein said elastic tolerance preselecting means includes:
a first switch, which is preselected if the elastic tolerance of said elastic member is 3%;
a second switch, which is preselected if the elastic tolerance of said elastic member is 6%; and
a third switch, which is preselected if the elastic tolerance of said elastic member is 9%.

3. A pressure gauge, comprising:
a pressure sensing element, which includes an elastic member and a variable resistor having a moving portion, said moving portion being coupled to said elastic member so that the movement of said elastic member is capable of causing the displacement of said moving portion and thus adjusting the resistance value of said variable resistor;
generating means, coupled to said variable resistance, for generating an output electrical signal which is proportional to the resistance value of said variable resistor;
converting means, coupled to said generating means, for converting the output electrical signal therefrom into a display signal;
an indicator, coupled to said generating means, for displaying the value of the pressure in accordance with the display signal received therefrom; and
calibrating means for setting an initial output electrical signal occasioned by the initial displacement of said moving portion of said variable resistor as a zero-reference signal, and resetting the displayed value of said indicator to zero, said converting means subsequently comparing the output electrical signal actuated by measuring the pressure with the zero-reference signal and producing the corresponding display signal.

4. A pressure gauge as claimed in claim 3, wherein said converting means further comprises means for selection of a proper pressure unit to be displayed.

5. A pressure gauge as claimed in claim 3, wherein said converting means further comprises means for selecting a switch in accordance with the manufacturing error of the elastic constant of said elastic member incorporated in the pressure gauge, said converting means thereafter converting the output electrical signal to the display signal accordingly.

6. A pressure gauge as claimed in claim 3, wherein said indicator is a liquid crystal display (LCD).

7. A pressure gauge, comprising:
a pressure sensing element, which includes an elastic member and a variable resistor having a moving portion, said moving portion being coupled to said elastic member so that the movement of said elastic member is capable of causing the displacement of said moving portion and thus adjusting the resistance value of said variable resistor;
generating means, coupled to said variable resistance, for generating an output electrical signal which is proportional to the resistance value of said variable resistor;
converting means, coupled to said generating means, for converting the output electrical signal therefrom into a display signal;
an indicator, coupled to said generating means, for displaying the value of the pressure in accordance with the display signal received therefrom;
wherein said converting means further comprises means for selecting a switch in accordance with the manufacturing error of the elastic constant of said elastic member incorporated in the pressure gauge, said converting means thereafter converting the output electrical signal to the display signal accordingly.

8. The pressure gauge of claim 7, wherein the converting means includes:
a first switch, which is preselected if the elastic tolerance of said elastic member is 3%;
a second switch, which is preselected if the elastic tolerance of said elastic member is 6%; and
a third switch, which is preselected if the elastic tolerance of said elastic member is 9%.

9. The pressure gauge of claim 8, further comprising:
calibrating means for setting an initial output electrical signal occasioned by the initial displacement of said moving portion of said variable resistor as a zero-reference signal, and resetting the displayed value of said indicator to zero, said converting means subsequently comparing the output electrical signal actuated by measuring the pressure with the zero-reference signal and producing the corresponding display signal.

10. The pressure gauge of claim 7, wherein said converting means further comprises means for selection of a proper pressure unit to be displayed.

11. The pressure gauge of claim 7, wherein said indicator is a liquid crystal display (LCD).

* * * * *